(12) United States Patent  (10) Patent No.: US 9,025,345 B2
Shimada et al.  (45) Date of Patent: May 5, 2015

(54) POWER SUPPLY APPARATUS

(75) Inventors: Takae Shimada, Hitachinaka (JP); Kimiaki Taniguchi, Hadano (JP); Hiroyuki Shoji, Hitachi (JP)

(73) Assignee: Hitachi Information & Telecommunication Engineering, Ltd., Yokahama-shi (JP)

( * ) Notice: Subject to any disclaimer, the term of this patent is extended or adjusted under 35 U.S.C. 154(b) by 294 days.

(21) Appl. No.: 13/480,505

(22) Filed: May 25, 2012

(65) Prior Publication Data

US 2012/0300502 A1 Nov. 29, 2012

(30) Foreign Application Priority Data

May 26, 2011 (JP) ................. 2011-117673

(51) Int. Cl.
*H02M 3/335* (2006.01)
*H02M 7/44* (2006.01)
*H02M 1/42* (2007.01)

(52) U.S. Cl.
CPC ............ *H02M 1/4258* (2013.01); *Y02B 70/126* (2013.01)

(58) Field of Classification Search
CPC ........................ H02M 1/4258; H02M 7/5387
USPC ............... 363/16, 17, 97, 98, 131, 132, 21.02
See application file for complete search history.

(56) References Cited

U.S. PATENT DOCUMENTS

| | | | |
|---|---|---|---|
| 8,130,515 B2 | 3/2012 | Shimada et al. | |
| 8,169,797 B2 * | 5/2012 | Coccia et al. | ............. 363/21.03 |
| 8,199,530 B2 | 6/2012 | Sase et al. | |
| 8,421,424 B2 | 4/2013 | Ishii | |
| 8,705,252 B2 * | 4/2014 | Duvnjak | ............ 363/17 |
| 2009/0290385 A1 * | 11/2009 | Jungreis et al. | ................. 363/17 |
| 2010/0232180 A1 | 9/2010 | Sase et al. | |

(Continued)

FOREIGN PATENT DOCUMENTS

| | | |
|---|---|---|
| CN | 1551471 A | 12/2004 |
| CN | 101060284 A | 10/2007 |

(Continued)

OTHER PUBLICATIONS

Office Action in JP 2011-117673, mailed Jul. 16, 2013 [in Japanese, 2 pgs.].

(Continued)

*Primary Examiner* — Matthew Nguyen
(74) *Attorney, Agent, or Firm* — Baker Botts L.L.P.

(57) ABSTRACT

A high-efficiency power supply apparatus is provided in light of the reduction of the switching loss. The power supply apparatus connected between the AC power supply and the DC load converts the AC power supplied from the AC power supply to the DC power and supplies it to the DC load. The power supply apparatus comprises the first switching circuit for outputting the switched positive and negative voltages to the primary winding of the transformer, a second switching circuit for supplying the DC power induced in the secondary winding of the transformer and switched to the DC load connected to the second AC terminals, a resonance inductor serial-connected to the primary winding, and a control unit for controlling the switching operations performed by the first and second switching circuits. The control unit substantially short-circuits the second AC terminals by controlling the switching operations performed by the second switching circuit.

8 Claims, 14 Drawing Sheets

(56) References Cited

U.S. PATENT DOCUMENTS

2012/0294045 A1* 11/2012 Fornage et al. ............... 363/17
2014/0009968 A1* 1/2014 Matsuura et al. ............. 363/17

FOREIGN PATENT DOCUMENTS

| CN | 101378232 A | 3/2009 |
|---|---|---|
| JP | 2001-204170 | 7/2001 |
| JP | 2002-059029 | 2/2002 |
| JP | 2004-336943 | 11/2004 |
| JP | 2006-230135 | 8/2006 |
| JP | 2009-55747 | 3/2009 |
| JP | 2010-213430 | 9/2010 |
| JP | 2011-78261 | 4/2011 |

OTHER PUBLICATIONS

Office Action in Taiwanese Patent Application 101113934, mailed Feb. 27, 2014 [7 pgs.].

Office Action in Chinese Patent Appln. Ser. No. 201210159766.5, mailed Apr. 8, 2014, (in Chinese, 8 pgs.).

* cited by examiner

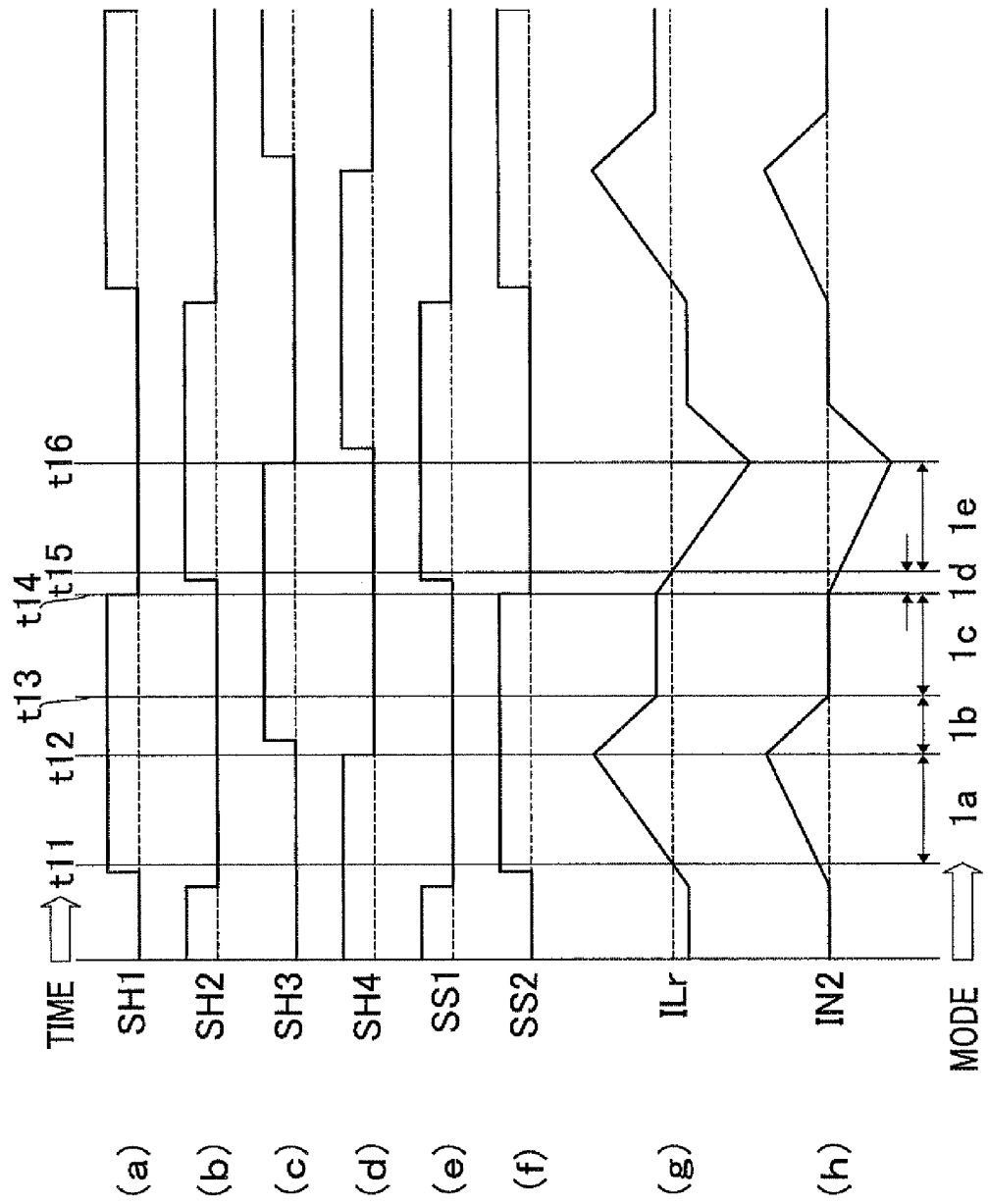

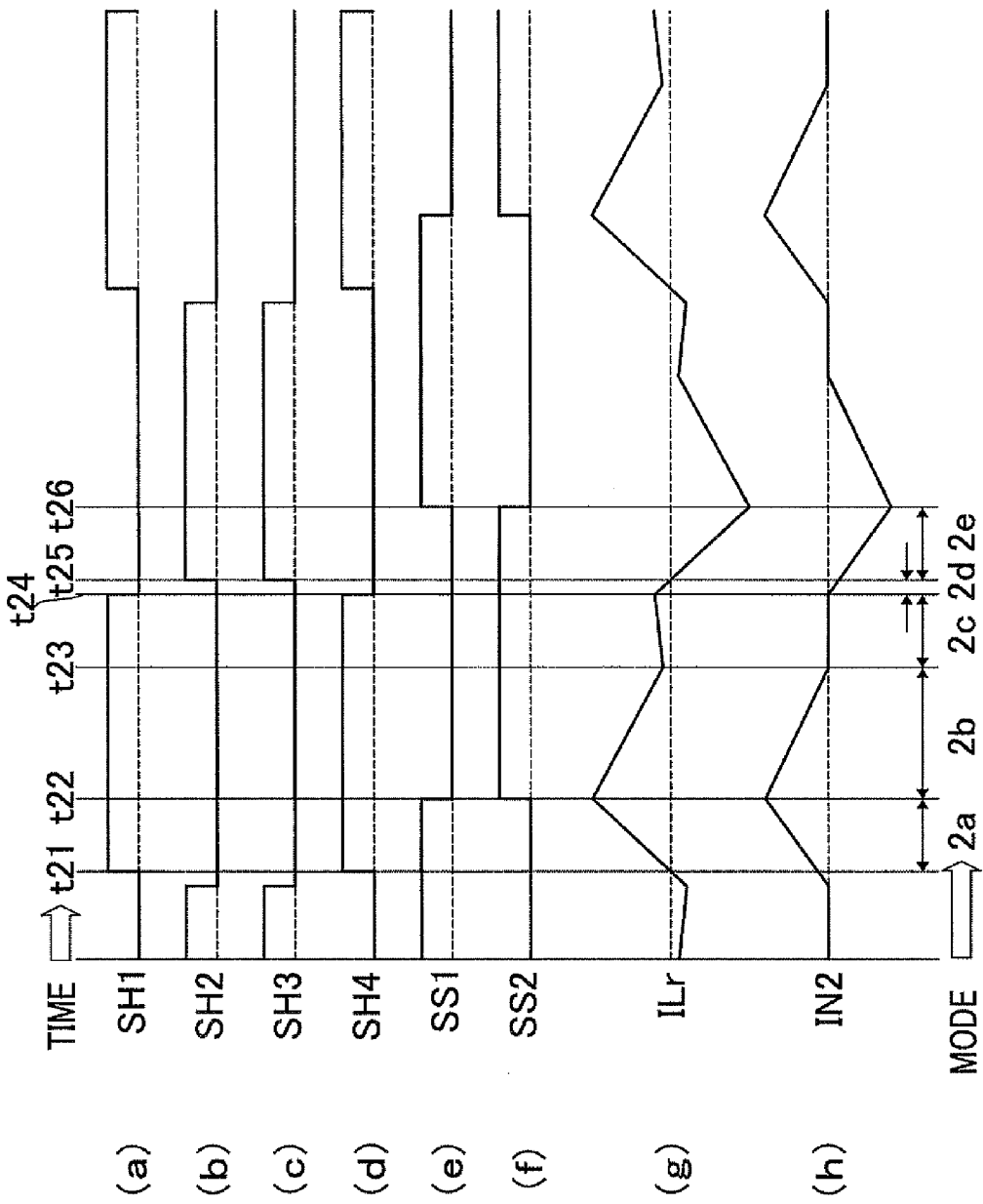

POWER SUPPLY APPARATUS

CROSS REFERENCE TO RELATED APPLICATION

This application claims the priority of Japanese Application No. 2011-117673, filed on May 26, 2011, the entire specification, claims and drawings of which are incorporated herewith by reference.

BACKGROUND OF THE INVENTION

1. Field of the Invention

The present invention relates to a power supply apparatus which is connected between an AC power supply and a DC load, converts the AC power supplied from the AC power supply to a DC power, and supplies it to the DC load.

2. Description of the Related Art

Recently, the global environment conservation has been getting the higher awareness. This trend leads to the improvement of efficiency of apparatuses to convert the AC power to the DC power and to supply it to DC loads. This is because the improvement of efficiency of power supply apparatuses contributes to the electric power saving, and eventually leads to the global environment conservation.

In order to achieve the improvement of efficiency of the power supply apparatuses, there are two major approaches. A first is to reduce the conduction loss caused by the electric current to flow in the switching elements, and a second is to reduce the switching loss caused by the switching elements to switch.

The paragraph 0017 through 0020 and FIG. 2 of JP 2004-336943 A disclose an electric-power-conversion apparatus which has sought to reduce the conduction loss by connecting a pair of self-extinguishing elements (small forward voltage drop compared to diode) instead of rectifier diodes, in the lower arm part of the bridge rectifier circuit located in the secondary side of the transformer.

Furthermore, the paragraph 0053 through 0054 and FIG. 6 of JP 2001-204170 A disclose a charge apparatus of capacitors of a configuration to connect a pair of switching circuits instead of rectifier diodes, in the lower arm part of the bridge rectifier circuit located in the secondary side of the transformer. The charge apparatus accumulates the electric current energy in a reactor serial-connected to the secondary side of the transformer when the switching circuit is switched on, and charges the capacitor by utilizing the electric current energy of the reactor when the switching circuit is switched off.

However, in the apparatuses according to JP 2004-336943 A and JP 2001-204170 A, a pair of self-extinguishing elements, or a pair of switching circuits are turned on in the condition where the voltage is applied, thus, a great amount of switching loss is caused. Furthermore, the loss has been a primary factor to prevent the improvement of efficiency of the apparatuses.

An object of the present invention is, in respect of the aforementioned actual condition, to provide a power supply apparatus of the high-efficiency in light of the reduction of the switching loss.

SUMMARY OF THE INVENTION

It is premised that the power supply apparatus according to the present invention is connected between the AC power supply to supply AC power and DC load, converts the AC power supplied from the AC power supply to DC power, and supplies it to the DC load.

The power supply apparatus according to the present invention comprises a first switching circuit, a first smoothing capacitor connected to first DC terminals, a second switching circuit, a resonance inductor serial-connected to either of primary winding or secondary winding or both thereof, and a control unit.

The first switching circuit inputs the full-wave-rectification voltage of the AC power supply by way of the first DC terminal, and outputs positive and negative voltages generated by performing the switching operations to the input voltage, to the primary winding of the transformer connected to first AC terminals.

The second switching circuit inputs the electric power induced in the secondary winding to configure the transformer being magnetic-coupled to the primary winding, by way of the second AC terminal connected between terminals of the secondary winding, and supplies the DC power generated by performing the switching operations to the input electric power and smoothed by the second smoothing capacitor connected to second DC terminals, to the DC load connected to second DC terminals.

The control unit functions to substantially short-circuit the second AC terminals, by controlling the switching operations performed by the second switching circuit.

BRIEF DESCRIPTION OF THE DRAWINGS

FIG. 3 is a timing chart drawing for explaining operations of the first phase-shift control of the power supply apparatus 1 according to the first embodiment of the present invention;

FIG. 5 is a timing chart drawing for explaining operations of the second phase-shift control of the power supply apparatus 1 according to the first embodiment of the present invention;

DETAILED DESCRIPTION OF THE PREFERRED EMBODIMENTS

Hereinafter, a plurality of embodiments of the present invention are described in detail with reference to the drawings.

[First Embodiment]

Figure 1:
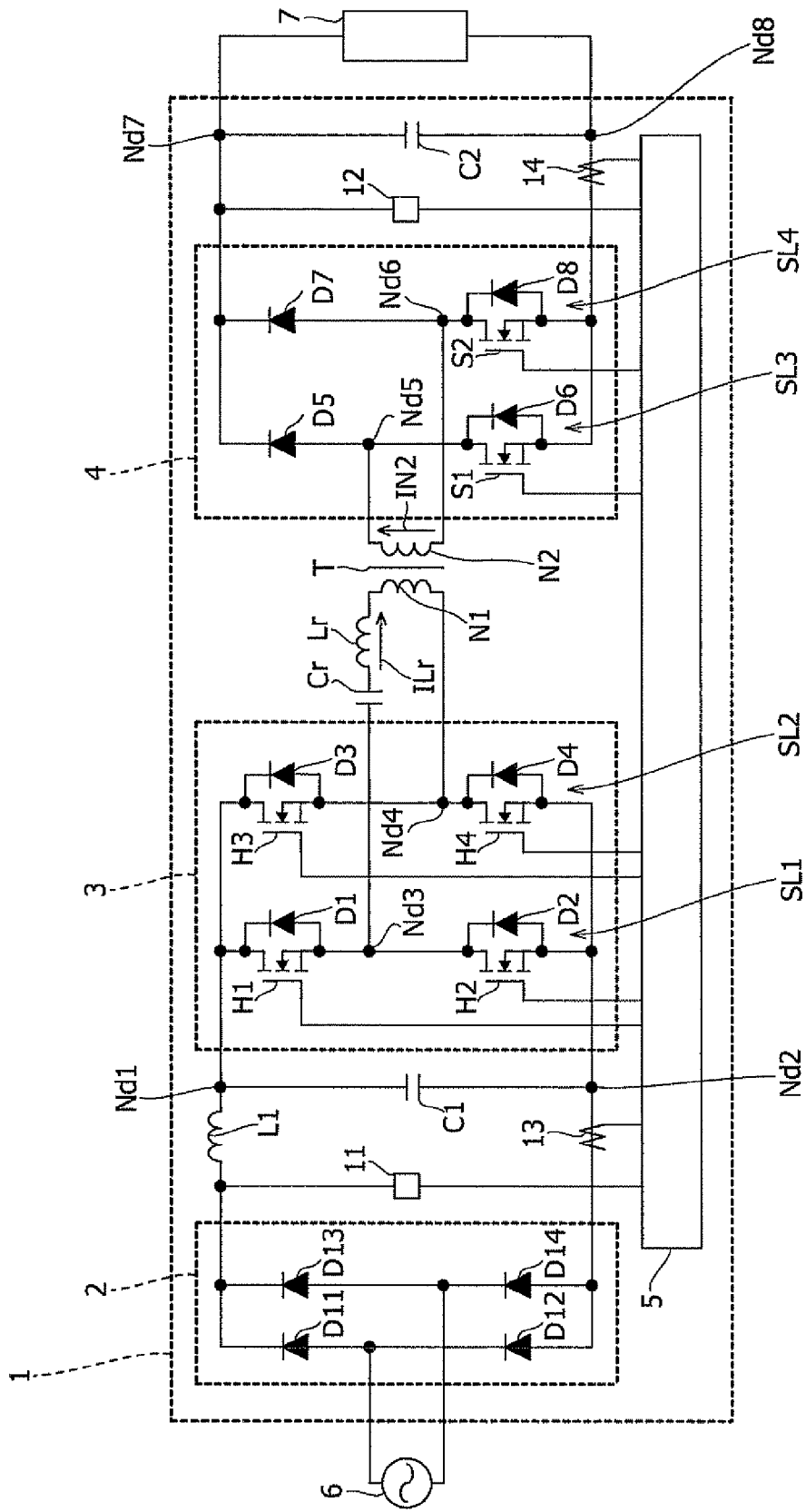
FIG. 1 is a circuit diagram of a power supply apparatus 1 according to a first embodiment of the present invention.

FIG. 1 is a circuit diagram of the power supply apparatus 1 according to a first embodiment of the present invention. As shown in FIG. 1, the power supply apparatus 1 is connected between an AC power supply 6 and a DC load 7, converts the AC power supplied from the AC power supply 6 to a DC power, and supplies the electric power to the DC load 7. In the case that the DC load 7 comprises a secondary battery, the power supply apparatus 1 charges the secondary battery by utilizing the DC power which the AC power supplied from the AC power supply 6 is converted into. Incidentally, in the case to utilize the terminology of "connect" in the present invention, unless otherwise mentioned, "electrically connect" is denoted, As shown in FIG. 1, the power supply apparatus 1 comprises a bridge-type rectifier circuit 2 for full-wave-rectifying the AC voltage wave form of the AC power supply 6, first and second switching circuits 3, 4, and a control unit 5 for controlling the switching operations performed by these first and second switching circuits 3, 4. In addition, the power supply apparatus 1 comprises a transformer T for magnetic-coupling a primary winding N1 and a secondary winding N2. A resonance capacitor Cr and a resonance inductor Lr are serial-connected between terminals of the primary winding N1.

As shown in FIG. 1, the rectifier circuit 2 includes first through fourth rectifier diodes D11 through D14 which are mutually bridge-connected, and full-wave-rectifies the AC voltage wave form of the AC power supply 6, by utilizing these first through fourth rectifier diodes D11 through D14. The voltage full-wave-rectified this way is applied to a first smoothing capacitor C1 by way of a smoothing inductor L1. The first smoothing capacitor C1 comprising a pair of terminals, as shown in FIG. 1, is connected to a first node Nd1 at one terminal and to a second node Nd2 at the other terminal, respectively. The first and second nodes Nd1, Nd2 correspond to "first DC terminals" of the present invention.

As shown in FIG. 1, the first switching circuit 3 is configured with first through fourth switching elements H1 through H4 full-bridge-connected. The first and second switching elements H1, H2 are serial-connected by way of a third node Nd3. This serial-connection circuit is called a first switching leg SL1. The third and fourth switching elements H3, H4 are serial-connected by way of a fourth node Nd4. This serial-connection circuit is called a second switching leg SL2. These first and second switching legs SL1, SL2 are mutually parallel-connected. Incidentally, the third and fourth nodes Nd3, Nd4 correspond to the "first AC terminals" of the present invention.

As shown in FIG. 1, MOS-FET can be preferably adopted for the first through fourth switching elements H1 through H4. First through fourth diodes D1 through D4 are inverse-parallel-connected to each of the first through fourth switching elements H1 through H4, as shown in FIG. 1. These first through fourth diodes D1 through D4 may utilize the body diode originally embedded by MOS-FET, as shown in FIG. 1.

As shown in FIG. 1, in the first switching circuit 3, terminals connected to the first and second nodes Nd1, Nd2 are referred to as the first DC terminals, and terminals connected to the third and fourth nodes Nd3, Nd4 are referred to as the first AC terminals. In the first switching circuit 3, the positive and negative voltages are applied to the serial-connection circuit comprising the resonance capacitor Cr, the resonance inductor Lr, and the primary winding N1 serial-connected between the first AC terminals Nd3, Nd4, by utilizing the voltage charged to the first smoothing capacitor C1 connected between the first DC terminals Nd1, Nd2.

As shown in FIG. 1, the second switching circuit 4 comprises a third switching leg SL3 to serial-connect a fifth diode D5 and a fifth switching element S1 by way of a fifth node Nd5, and a fourth switching leg SL4 to serial-connect a seventh diode D7 and a sixth switching element S2 by way of a sixth node Nd6. These third and fourth switching legs SL3, SL4 are mutually parallel-connected. Incidentally, the fifth and sixth nodes Nd5, Nd6 correspond to the "second AC terminals" of the present invention.

As shown in FIG. 1, MOS-FET can be preferably adopted for the fifth and sixth switching elements S1, S2. Sixth and eighth diodes D6, D8 are inverse-parallel-connected to each of the fifth and sixth switching elements S1, S2, as shown in FIG. 1. These sixth and eighth diodes D6, D8 may utilize the body diode originally embedded by MOS-FET, as shown in FIG. 1.

In the back-end (the DC load 7 side) of the second switching circuit 4, a second smoothing capacitor C2 and the DC load 7 are parallel-connected. The second smoothing capacitor C2 comprising a pair of terminals, as shown in FIG. 1, is connected to a seventh node Nd7 at one terminal and to an eighth node Nd8 at the other terminal, respectively. The seventh and eighth nodes Nd7, Nd8 correspond to the "second DC terminals" of the present invention.

In the first switching circuit 4, terminals connected to the fifth and sixth nodes Nd5, Nd6 are referred to as the second AC terminals, and terminals connected to the seventh and eighth nodes Nd7, Nd8 are referred to as the second DC terminals. In the second switching circuit 4, the electric power of the secondary winding N2 connected between the second AC terminals Nd5, Nd6 is applied respectively to the second smoothing capacitor C2 and the DC load 7 parallel-connected between the second DC terminals Nd7, Nd8.

That is to say, in the second switching circuit 4, terminals connected to the third switching leg SL3 (equivalent to the second DC terminals Nd7, Nd8) are referred to as the second DC terminals, and terminals connected to the serial node Nd5 of the fifth diode D5 and the fifth switching element S1 and the serial node Nd6 of the seventh diode D7 and the sixth switching element S2 are referred to as the second AC terminals.

In the first through sixth switching elements H1 through H4, S1, S2, the individual switching operations are comprehensively controlled by the control unit 5. The control unit 5 comprises a power factor improvement control function for controlling an input electric current from the AC power supply 6 in the sinusoidal shapes which are almost similar to the voltage of the AC power supply 6. To the control unit 5, a voltage sensor 11 for detecting the input voltage from the AC power supply 6, a voltage sensor 12 for detecting the voltage of the DC load 7, that is to say, the output voltage, an electric current sensor 13 for detecting the input electric current from the AC power supply 6, and an electric current sensor 14 for detecting the output electric current to the DC load 7 are connected respectively.

[First Phase-shift Control]

The circuit operation of the first phase-shift control of the power supply apparatus 1 is described with reference to FIG. 2A through FIG. 2E, and FIG. 3. FIG. 2A through FIG. 2E are drawings for explaining operations of the first phase-shift control of the power supply apparatus 1 according to the first embodiment. More specifically, FIG. 2A through FIG. 2E show each of circuit operations of the mode 1a through 1e according to the first phase-shift control. FIG. 2A, FIG. 2B, FIG. 2C, FIG. 2D and FIG. 2E correspond to the mode 1a, the mode 1b, the mode 1c, the mode 1d and the mode 1e, respectively.

FIG. 3 is a timing chart drawing for explaining the on/off condition in each part of the power supply apparatus 1 according to the first embodiment, and the time transition of the electric current wave form. Here, as shown in FIG. 1 and FIG. 3, the on/off condition of the first switching element H1, the on/off condition of the second switching element H2, the on/off condition of the third switching element H3, the on/off condition of the fourth switching element H4, the on/off condition of the fifth switching element S1, and the on/off condition of the sixth switching element S2 are defined as SH1, SH2, SH3, SH4, SS1, and SS2, respectively. In the timing chart drawing shown in FIG. 3, the solid line chart at the same level as the reference level shown in a dotted line indicates the off-condition, and the solid line chart at the high level compared to the reference level indicates the on-condition. In addition, the electric current to flow in the resonance inductor Lr is defined as ILr, and the electric current to flow in the secondary winding N2 is defined as IN2.

Incidentally, in the description according to the first phase-shift control, only the operation in the case that the voltage of the AC power supply 6 is of one polarity is described, and the description of the operation in the case that the voltage of the AC power supply 6 is of the other polarity is omitted. This is because it is easy to understand the operation in the latter case by comparing the operation in the former case.

The first phase-shift control is executed in the case that the power supply voltage is equal to or greater than the prescribed value, on the basis of the judgment result of the control unit 5 according to whether the voltage of the AC power supply 6 is equal to or greater than the prescribed value, or not. This prescribed value is determined on the basis of a step-up ratio, which is a value to divide the input voltage (full-wave-rectification voltage of the AC power supply 6) into the output voltage (inter-terminal voltage of the DC load 7). That is to say, the first phase-shift control is executed in the case that the step-up ratio is low compared to the prescribed level. Incidentally, the higher the output voltage is and the lower the input voltage is, the higher the step-up ratio becomes.

In the description of the first embodiment, the voltage between terminals of the switching element in the on-condition, alternatively, the voltage in the level equivalent to or lower than the forward drop voltage of the diode, is called zero voltage. In addition, in the case that the voltage between terminals of a certain switching element is the zero voltage, turning-on of this switching element is called zero voltage switching. By the zero voltage switching, in conjunction with the suppression of the switching loss, the effects to reduce higher harmonic waves, EMI (Electro Magnetic Interference; Electro Magnetic Interference) noise or the like are expected. This is because, in the zero voltage switching, a transient phenomenon of the voltage/electric current is not generated in principle, between terminals of the switching element.

(Mode 1a)

Figure 2A:
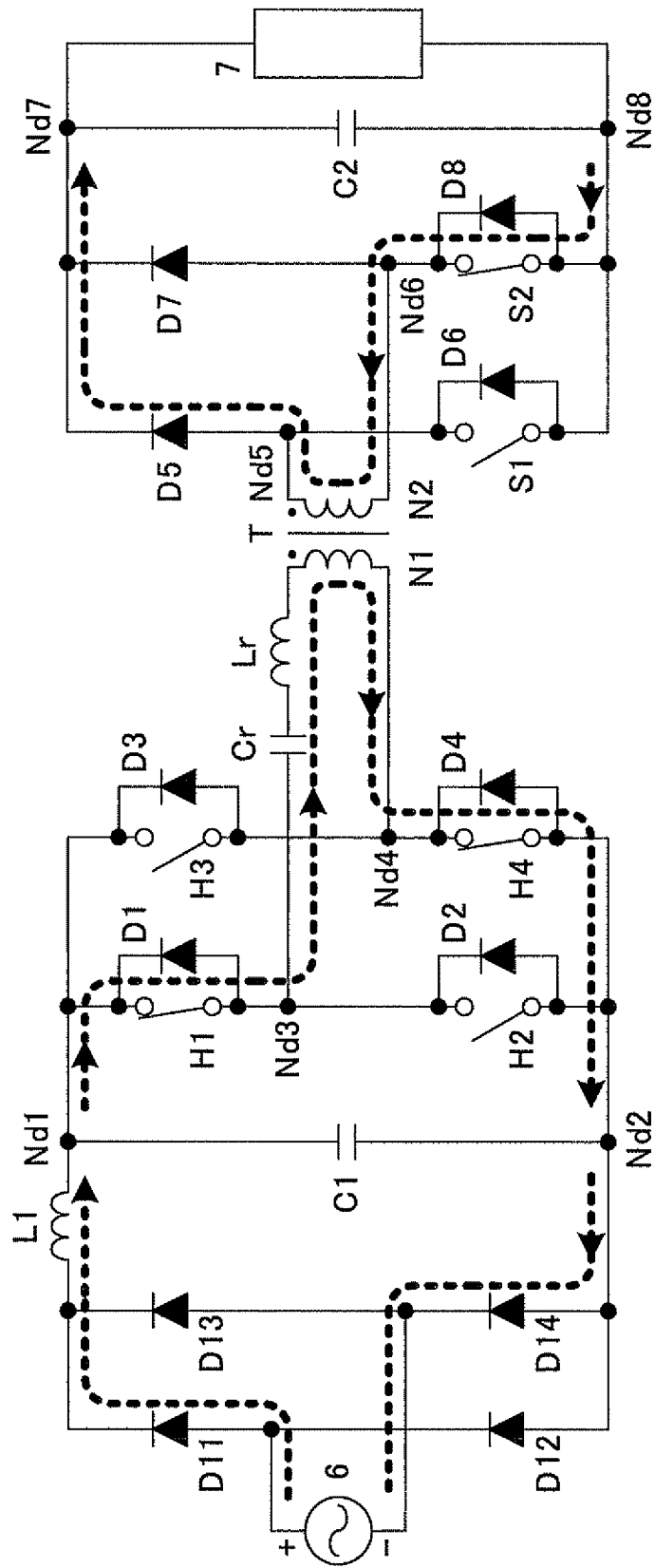
FIG. 2A is a drawing for explaining operations of a first phase-shift control of the power supply apparatus 1 according to the first embodiment of the present invention.

In the mode 1a defined in the period from the time t11 to the time t12 shown in FIG. 3, as shown in FIG. 2A, and FIG. 3, the first and fourth switching elements H1, H4 are in the on-condition. In this case, in the vicinity of the first switching circuit 3, the voltage (hereinafter, referred to as a "first input voltage") generated between terminals of the first smoothing capacitor C1 is applied to the resonance capacitor Cr, the resonance inductor Lr, and the primary winding N1, respectively.

As a result, as shown in FIG. 2A, the electric current route by way of each part of the first node Nd1-->the first switching element H1-->the third node Nd3-->the resonance capacitor Cr-->the resonance inductor Lr-->the primary winding N1--> the fourth node Nd4-->the fourth switching element H4--> the second node Nd2, is formed. Along this electric current route, the electric current flows.

In the vicinity of the second switching circuit 4, the electric current is induced in the secondary winding N2, because of the power-on to the primary winding N1. As a result, as shown in FIG. 2A, the electric current route by way of each part of the eighth node Nd8-->the sixth switching element S2-->the sixth node Nd6-->the secondary winding N2-->the fifth node Nd5-->the fifth diode D5-->the seventh node Nd7, is formed. Along this electric current route, the electric current flows. In the mode 1a, as shown in FIG. 2A and FIG. 3, the sixth switching element S2 is in the on (synchronous rectification) condition.

In the vicinity of the AC power supply 6, as shown in FIG. 2A, the electric current route by way of each part of the second node Nd2-->the fourth rectifier diode D14-->the AC power supply 6-->the first rectifier diode D11-->the smoothing inductor L1-->the first node Nd1, is formed. Along this electric current route, the electric current flows.

(Mode 1b)

If the fourth switching element H4 is turned off (see FIG. 3) in the timing of the time t12 shown in FIG. 3, it will be the condition of the mode 1b defined in the period from the time t12 to the time t13. In this case, in the vicinity of the first switching circuit 3, the resonance inductor electric current ILr which flowed by way of the fourth switching element H4 loses the destination, and is commuted to the third diode D3.

Figure 2B:
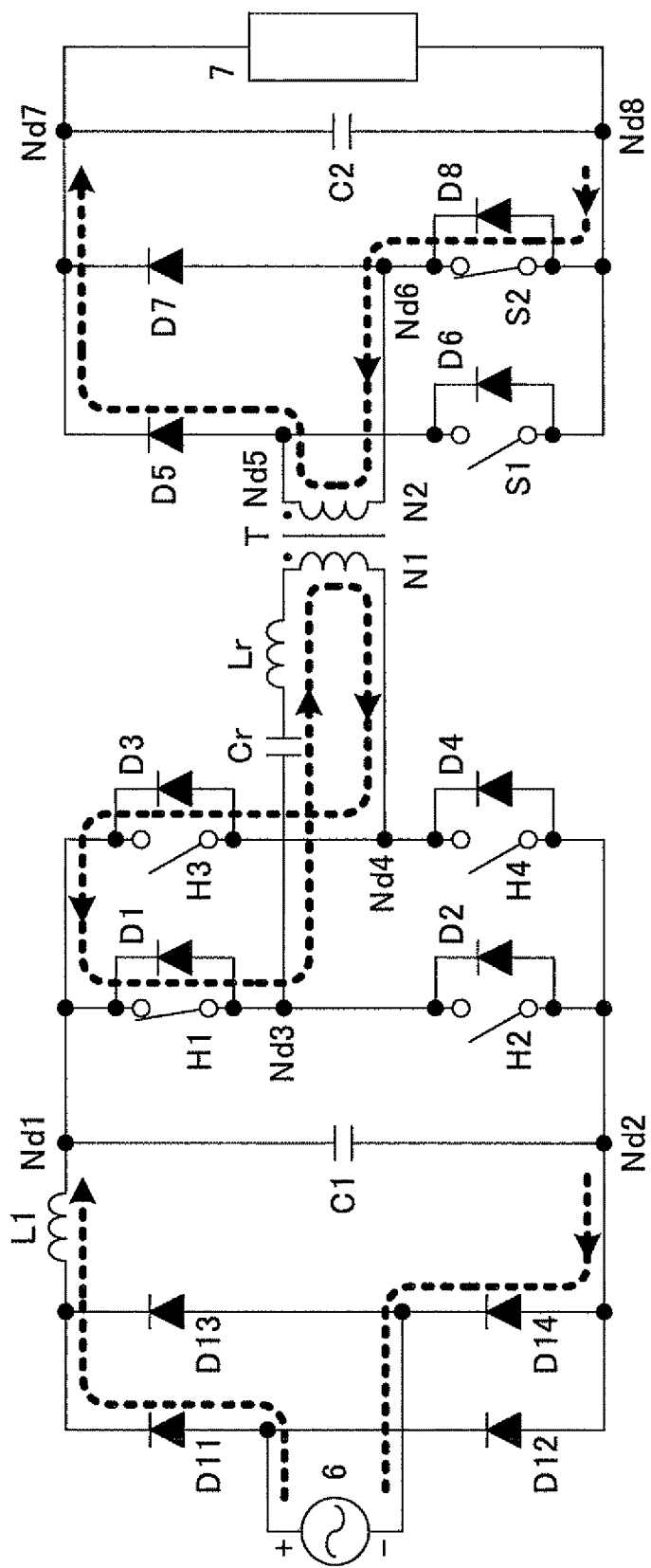
FIG. 2B is a drawing for explaining operations of the first phase-shift control of the power supply apparatus 1 according to the first embodiment of the present invention.

As a result, as shown in FIG. 2B, the electric current route by way of each part of the first node Nd1-->the first switching element H1-->the third node Nd3-->the resonance capacitor Cr-->the resonance inductor Lr-->the primary winding N1--> the fourth node Nd4-->the third diode D3 inverse-parallel-connected to the third switching element H3-->the first node Nd1, is formed. The electric current circulating this electric current route flows.

In the vicinity of the second switching circuit 4, the electric current is induced in the secondary winding N2, because of the power-on to the primary winding N1. As a result, as shown in FIG. 2B, the electric current route by way of each part of the eighth node Nd8-->the sixth switching element S2-->the sixth node Nd6-->the secondary winding N2-->the fifth node Nd5-->the fifth diode D5-->the seventh node Nd7, is formed. Along this electric current route, the electric current flows. In the mode 1b, as shown in FIG. 2B and FIG. 3, the sixth switching element S2 is in the on (synchronous rectification) condition.

The electromagnetic energy accumulated in the resonance inductor Lr is supplied to the primary winding N1 of the transformer T. As a result, the electric currents ILr, IN2 of the primary and secondary windings N1, N2 gradually decrease, as shown in FIG. 3. In the initial period of the mode 1b, as shown in FIG. 3, the third switching element H3 is in the off-condition. Matching the timing in this off-condition, the third switching element H3 is being turned on (zero voltage switching).

In the vicinities of each of the second switching circuit 4 and the AC power supply 6, as shown in FIG. 2B, an electric current route which is similar to the mode 1*a* is formed. Along this electric current route, the electric current flows. Accordingly, the duplicated description is omitted. Incidentally, in the mode 1*b*, if the switching elements H1, H4 are turned off before the secondary winding electric current IN2 completes flowing, the subsequent mode 1*c* may be omitted in some cases.

(Mode 1*c*)

Figure 2C:
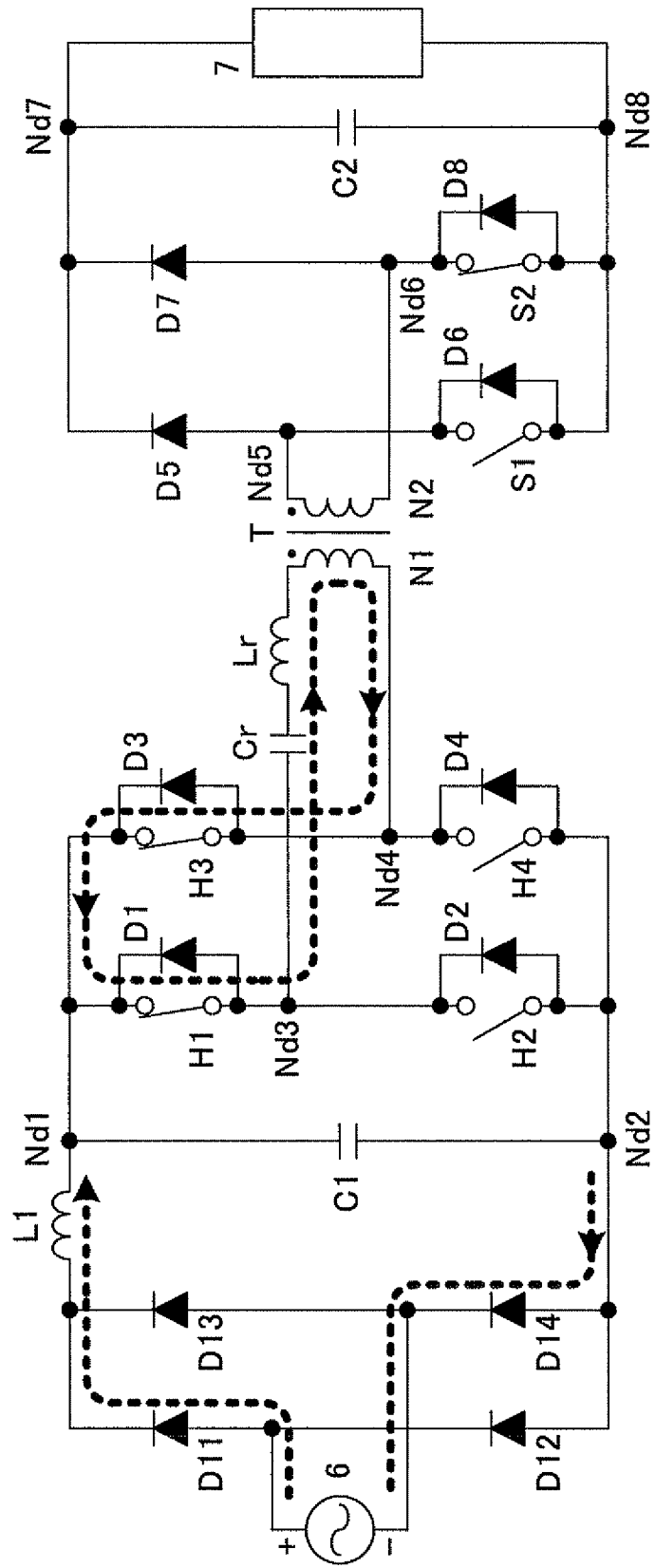
FIG. 2C is a drawing for explaining operations of the first phase-shift control of the power supply apparatus 1 according to the first embodiment of the present invention.

If the secondary winding electric current IN2 gradually decreases and lastly becomes zero, it will be the condition of the mode 1*c* defined in the period from the time t13 to the time t14. In the vicinities of each of the first switching circuit 3 and the AC power supply 6, as shown in FIG. 2C, an electric current route which is similar to the mode 1*b* is formed. Along the electric current route, the electric current flows. Accordingly, the duplicated description is omitted. In this mode 1*c*, the excitation electric current of the transformer T flows in the resonance inductor Lr and the primary winding N1 (see FIG. 3). In the vicinity of the second switching circuit 4, as shown in FIG. 2C and FIG. 3, the electric current is not induced in the secondary winding N2.

(Mode 1*d*)

If the first switching element H1 is turned off (see FIG. 3) in the timing of the time t14 shown in FIG. 3, it will be the condition of the mode 1*d*. In this case, in the vicinity of the first switching circuit 3, the resonance inductor electric current ILr which flowed in the first switching element H1 is commuted to the second diode D2.

Figure 2D:
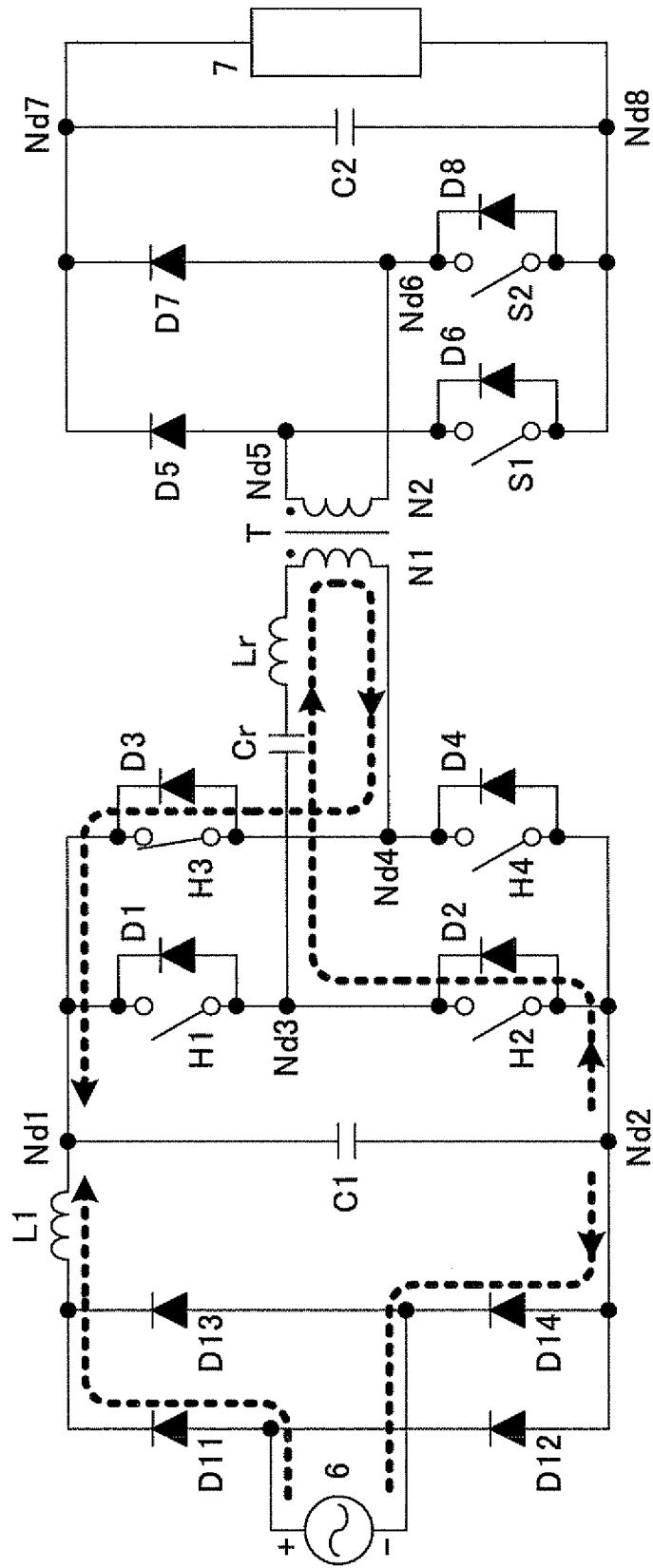
FIG. 2D is a drawing for explaining operations of the first phase-shift control of the power supply apparatus 1 according to the first embodiment of the present invention.

As a result, as shown in FIG. 2D, the electric current route by way of each part of the second node Nd2-->the second diode D2 inverse-parallel-connected to the second switching element H2-->the third node Nd3-->the resonance capacitor Cr-->the resonance inductor Lr-->the primary winding N1-->the fourth node Nd4-->the third switching element H3--> the first node Nd1, is formed. Along this electric current route, the electric current flows.

The electromagnetic energy accumulated in the resonance inductor Lr is supplied to the primary winding N1 of the transformer T. As a result, the electric current ILr of the primary winding N1 gradually decreases as shown in FIG. 3. On the other hand, the electric current IN2 of the secondary winding N2 gradually increases as shown in FIG. 3. In the beginning of the mode 1*d*, as shown in FIG. 3, the second switching element H2 is in the off-condition. Matching the timing in this off-condition, the second switching element H2 is being turned on (zero voltage switching).

In the vicinity of the second switching circuit 4, in the mode 1*c*, as shown in FIG. 2C and FIG. 3, the sixth switching element S2 is in the on (synchronous rectification) condition. In this case, in the mode 1*d*, as shown in FIG. 2D and FIG. 3, the sixth switching element S2 is being turned off, before the time t14.

In the vicinity of the AC power supply 6, as shown in FIG. 2D, an electric current route which is similar to the mode 1*c* is formed. Along the electric current route, the electric current flows. Accordingly, the duplicated description is omitted.

(Mode 1*e*)

In the time t15 shown in FIG. 3, if the circulation direction of the resonance inductor electric current ILr flowing in the primary winding N1 is inverted (in the example of FIG. 3, inversion from positive to negative), it will be the condition of the mode 1*e*. This mode 1*e* is a symmetric operation of the mode 1*a*.

Figure 2E:
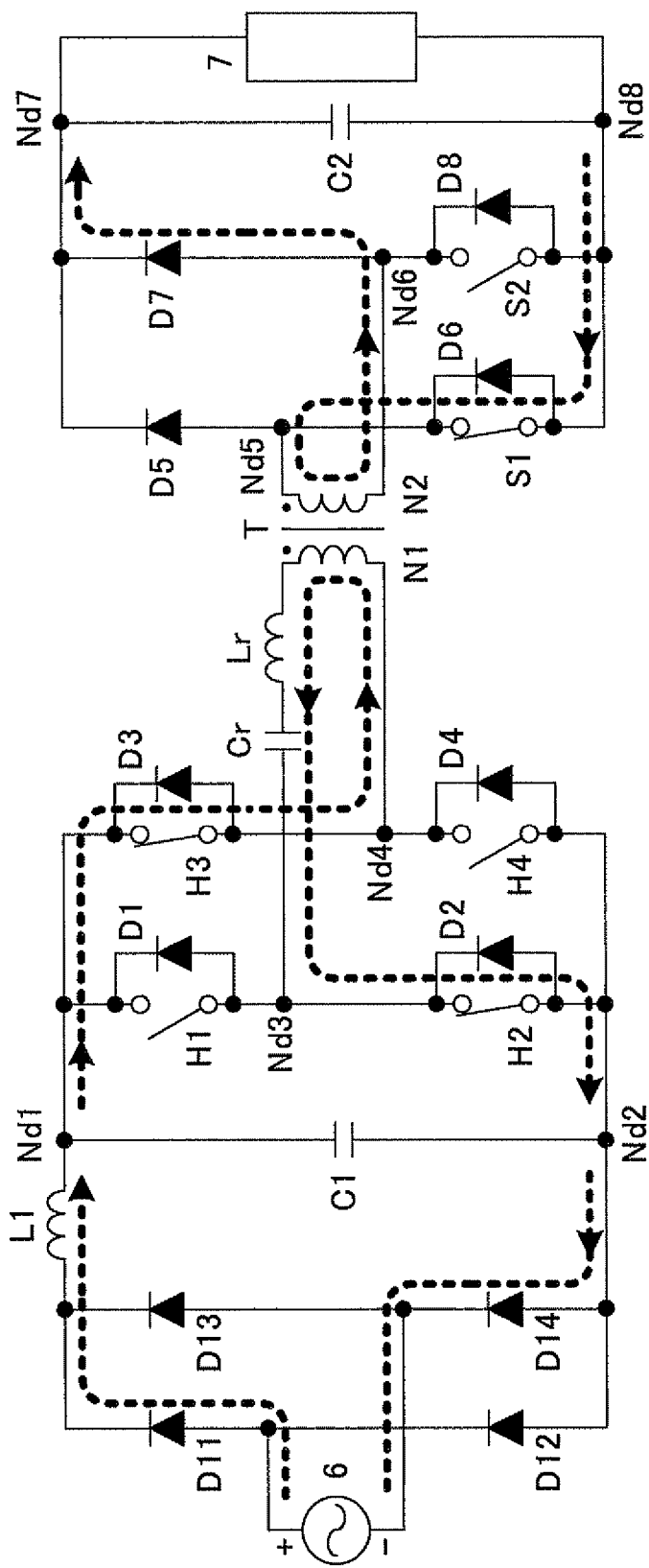
FIG. 2E is a drawing for explaining operations of the first phase-shift control of the power supply apparatus 1 according to the first embodiment of the present invention.

More specifically, in the mode 1*e* defined in the period from the time t15 to the time t16 shown in FIG. 3, as shown in FIG. 2E, and FIG. 3, the second and third switching elements H2, H3 are in the on-condition, in contrast to the mode 1*a*. In this case, in the vicinity of the first switching circuit 3, the first input voltage (voltage between the first DC terminals Nd1, Nd2) is applied to the resonance capacitor Cr, the resonance inductor Lr, and the primary winding N1, respectively.

As a result, as shown in FIG. 2E, the electric current route by way of each part of the first node Nd1-->the third switching element H3-->the fourth node Nd4-->the primary winding N1-->the resonance inductor Lr-->the resonance capacitor Cr-->the third node Nd3-->the second switching element H2-->the second node Nd2, is formed. Along this electric current route, the electric current flows.

In the vicinity of the second switching circuit 4, the electric current is induced in the secondary winding N2, because of the power-on to the primary winding N1. As a result, as shown in FIG. 2E, in contrast to the mode 1*a*, the electric current route by way of each part of the eighth node Nd8-->the fifth switching element S1-->the fifth node Nd5-->the secondary winding N2-->the sixth node Nd6-->the seventh diode D7--> the seventh node Nd7, is formed. Along this electric current route, the electric current flows. In the mode 1*e*, as shown in FIG. 2E and FIG. 3, the fifth switching element S1 is in the on (synchronous rectification) condition.

In the vicinity of the AC power supply 6, as shown in FIG. 2E, an electric current route which is similar to the mode 1*a* is formed. Along the electric current route, the electric current flows. Accordingly, the duplicated description is omitted.

Hereinafter, after each of the symmetric operations of the mode 1*b* through 1*d*, back to the mode 1*a*, and the aforementioned processing is repeated.

In the aforementioned first phase-shift control, the input electric current and the output electric power are adjusted, by changing the phase of the turn-off timing of the first and second switching elements H1, H2 and the turn-off timing of the third and fourth switching elements H3, H4, and performing the first duty control to change the duration of the period to apply the voltage between the first AC terminals Nd3, Nd4 of the first switching circuit 3.

That is to say, while the first and fourth switching elements H1, H4 together shorten the period of the mode 1*a* in the on-condition and reduce the input electric current and the output electric power, to the contrary, the input electric current and the output electric power are increased by lengthening the period of the mode 1*a*. In addition, while the second and third switching elements H2, H3 together shorten the period of the mode 1*e* in the on-condition and reduce the input electric current and the output electric power, to the contrary, the input electric current and the output electric power are increased by lengthening the period of the mode 1*e*.

In the first phase-shift control, in the case that the turn-off timings of the first and fourth switching elements H1, H4 are synchronized, the duration of the period to apply the voltage between the first AC terminals Nd3, Nd4 of the first switching circuit 3 is maximized. In addition, in the case that the turn-off timings of the second and third switching elements H2, H3 are synchronized, the duration of the period to apply the voltage between the output terminals Nd3, Nd4 of the first switching circuit 3 is maximized. In these cases, in the first phase-shift control, the maximum input electric power and output electric power are acquired. In the case of the requirement to acquire the higher electric power than the maximum input electric power and output electric power acquired by the first phase-shift control, the second phase-shift control to be described next is applied.

[Second Phase-Shift Control]

The circuit operation of the second phase-shift control of the power supply apparatus 1 is described with reference to FIG. 4A through FIG. 4E, and FIG. 5. FIG. 4A through FIG. 4E are drawings for explaining operations of the second phase-shift control of the power supply apparatus 1 according to the first embodiment. More specifically, FIG. 4A through FIG. 4E show each of circuit operations of the mode 2*a* through 2*e* according to the second phase-shift control. FIG. 4A, FIG. 4B, FIG. 4C, FIG. 4D and FIG. 4E correspond to the mode 2*a*, the mode 2*b*, the mode 2*c*, the mode 2*d* and the mode 2*e*, respectively. FIG. 5 is a timing chart drawing for explaining the on/off condition in each part out of the power supply apparatus 1 according to the first embodiment, and the time transition of the electric current wave form.

Incidentally, in the description according to the second phase-shift control, only the operation in the case that the voltage of the AC power supply 6 is of one polarity is described, and the operation in the case that the voltage of the AC power supply 6 is of the other polarity is omitted. This is because it is easy to understand the operation in the latter case by comparing the operation in the former case.

The second phase-shift control is executed in the case that the power supply voltage is lower than the prescribed value, on the basis of the judgment result of the control unit 5 according to whether the voltage of the AC power supply 6 is equal to or greater than the prescribed value, or not. This prescribed value is determined on the basis of a step-up ratio, which is a value to divide the input voltage (full-wave-rectification voltage of the AC power supply 6) into the output voltage (inter-terminal voltage of the DC load 7). That is to say, the second phase-shift control is executed in the case that the step-up ratio is high compared to the prescribed level, contrary to the case of the first phase-shift control.

(Mode 2*a*)

Figure 4A:
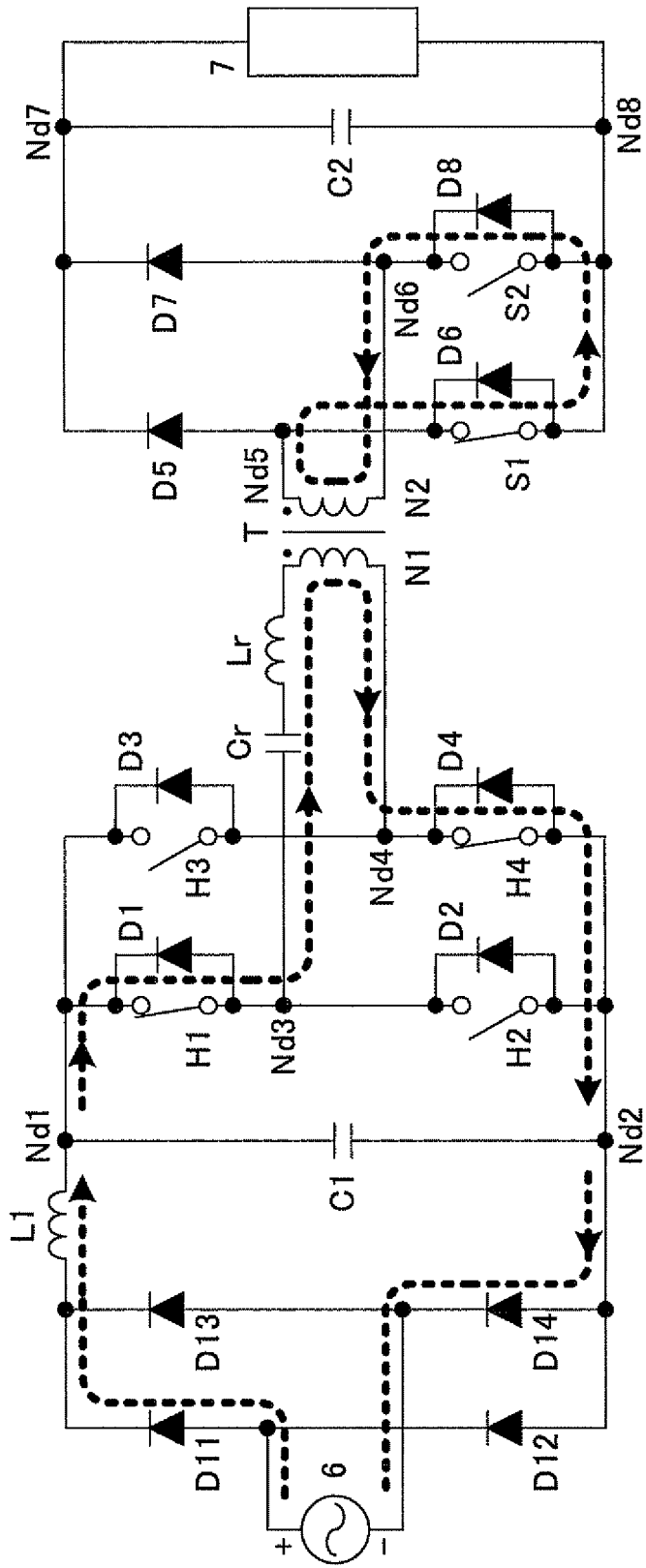
FIG. 4A is a drawing for explaining operations of a second phase-shift control of the power supply apparatus 1 according to the first embodiment of the present invention.

In the mode 2*a* defined in the period from the time t21 to the time t22 shown in FIG. 5, as shown in FIG. 4A, FIG. 5 and FIG. 3, the first and fourth switching elements H1, H4 are in the on-condition. In this case, in the vicinity of the first switching circuit 3, the first input voltage is applied to the resonance capacitor Cr, the resonance inductor Lr, and the primary winding N1, respectively. As a result, as shown in FIG. 4A, an electric current route which is similar to the mode 1*a* is formed. Along this electric current route, the electric current flows. Accordingly, the duplicated description is omitted.

In the vicinity of the second switching circuit 4, the electric current is induced in the secondary winding N2, because of the power-on to the primary winding N1. As a result, as shown in FIG. 4A, the electric current route by way of each part of the sixth node Nd6-->the secondary winding N2-->the fifth node Nd5-->the fifth switching element S1-->the eighth diode D8 inverse-parallel-connected to the sixth switching element S2-->the sixth node Nd6, is formed. The electric current circulating this electric current route flows. In the mode 2*a*, as shown in FIG. 4A and FIG. 5, the fifth switching element S1 is in the on (synchronous rectification) condition.

Therefore, the terminals (the second AC terminals) Nd5, Nd6 of the secondary winding N2 are in the substantially short-circuited condition. Here, the "substantially short-circuit" according to the present invention denotes, in a broad sense, an electrical short-circuit which is regarded as a short-circuit, even if the voltage drop component (in the example of FIG. 4A, the voltage drop component by the eighth diode D8) which is almost negligible intervenes in the electric current route.

Since the terminals Nd5, Nd6 of the secondary winding N2 are in the substantially short-circuited condition, the voltage is generated, neither between the terminals Nd3, Nd4 of the primary winding N1 magnetically coupled to the secondary winding N2. Accordingly, in the mode 2*a*, in the vicinity of the first switching circuit 3, as shown in FIG. 5, the resonance inductor electric current ILr linearly increases. In the circuit condition shown in FIG. 4A, the synchronous rectification is caused by switching on the second switching element S2.

In the vicinity of the AC power supply 6, as shown in FIG. 4A, an electric current route which is similar to the mode 1*a*, by way of each part is formed. Along this electric current route, the electric current flows. Accordingly, the duplicated description is omitted.

(Mode 2*b*)

Figure 4B:
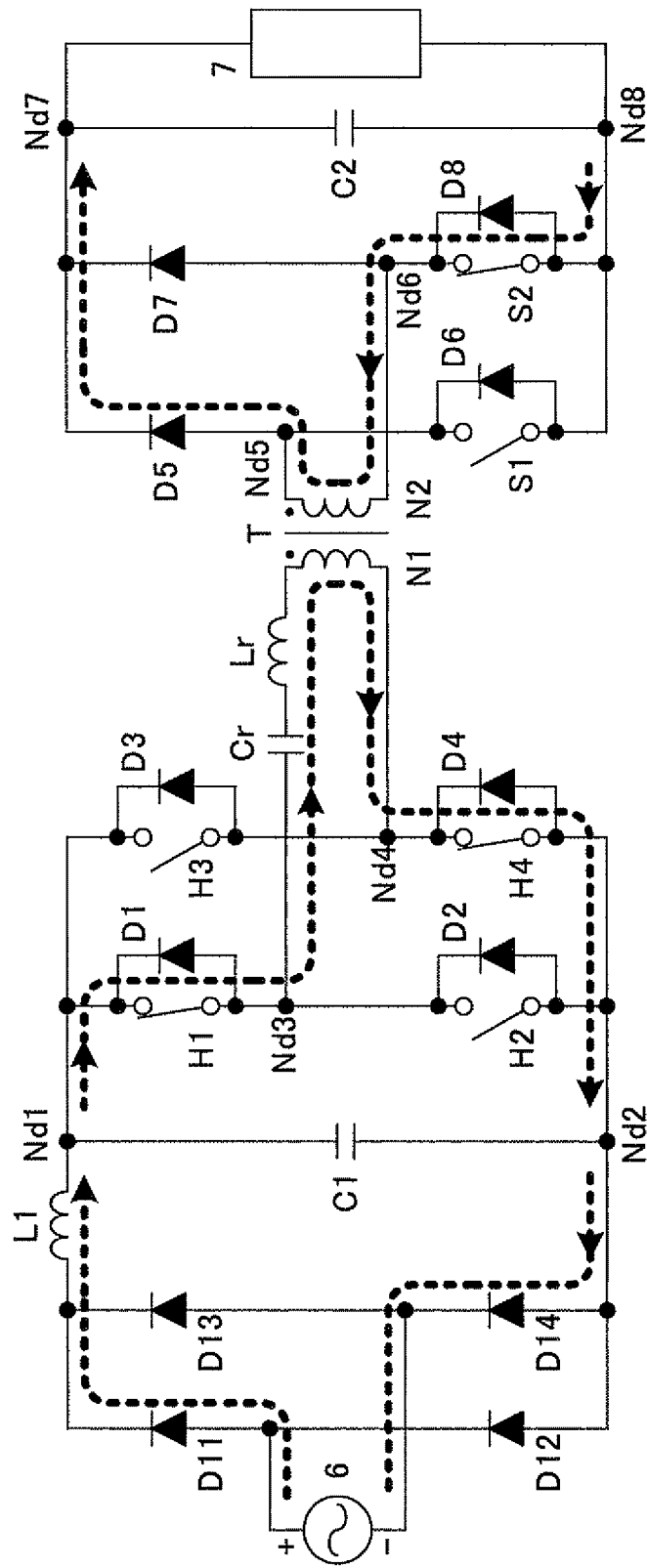
FIG. 4B is a drawing for explaining operations of the second phase-shift control of the power supply apparatus 1 according to the first embodiment of the present invention.

If the fifth switching element S1 is turned off (see FIG. 5) in the timing of the time t12 shown in FIG. 5, it will be the condition of the mode 2*b* defined in the period from the time t22 to the time t23. In this case, in the vicinities of each of the first switching circuit 3 and the AC power supply 6, as shown in FIG. 4B, an electric current route which is similar to the mode 2*a*, is formed. Along the electric current route, the electric current flows. Accordingly, the duplicated description is omitted.

The electromagnetic energy accumulated in the resonance inductor Lr is supplied to the primary winding N1 of the transformer T. As a result, the electric currents ILr, IN2 of the primary and secondary windings N1, N2 gradually decrease, as shown in FIG. 5.

In the vicinity of the second switching circuit 4, the electric current is induced in the secondary winding N2, because of the power-on to the primary winding N1. As a result, as shown in FIG. 4B, the electric current route by way of each part of the eighth node Nd8-->the sixth switching element 52-->the sixth node Nd6-->the secondary winding N2-->the fifth node Nd5-->the fifth diode D5-->the seventh node Nd7, is formed. Along this electric current route, the electric current flows. In the mode 2*b*, as shown in FIG. 4B and FIG. 5, the sixth switching element S2 is in the on (synchronous rectification) condition.

In the timing of the time t22 shown in FIG. 5, the sixth switching element S2 is in the off-condition. Matching the timing in this off-condition, the sixth switching element S2 is being turned on (zero voltage switching).

Incidentally, in the mode 2*b*, if the first and fourth switching elements H1, H4 are turned off before the secondary winding electric current IN2 gradually decreases and lastly becomes zero, the subsequent mode 2*c* may be omitted in some cases.

(Mode 2*c*)

Figure 4C:
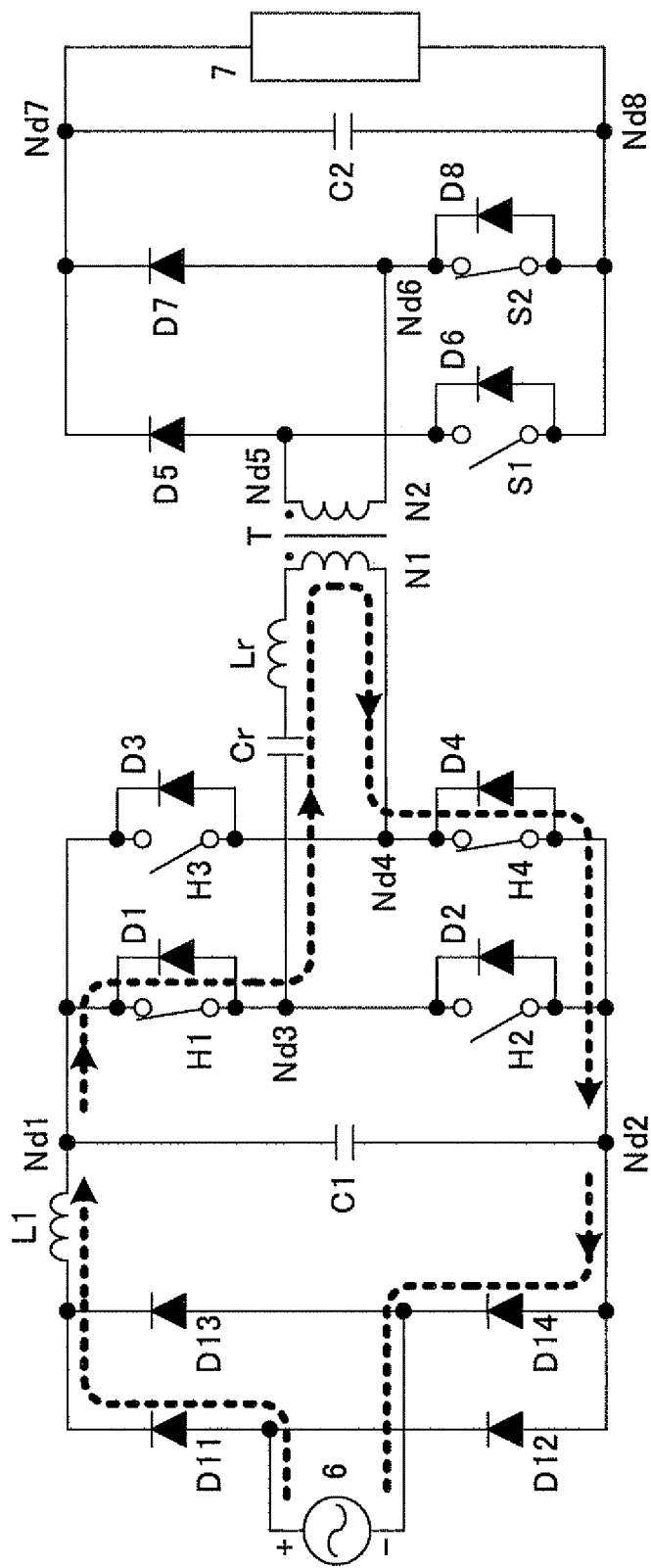
FIG. 4C is a drawing for explaining operations of the second phase-shift control of the power supply apparatus 1 according to the first embodiment of the present invention.

If the secondary winding electric current IN2 gradually decreases and lastly becomes zero, it will be the condition of the mode 2*c* defined in the period from the time t23 to the time t24. In the vicinities of each of the first switching circuit 3 and the AC power supply 6, as shown in FIG. 4C, an electric current route which is similar to the mode 2*b*, is formed. Along the electric current route, the electric current flows. Accordingly, the duplicated description is omitted. In this mode 2*c*, the excitation electric current of the transformer T flows in the resonance inductor Lr and the primary winding N1. In the vicinity of the second switching circuit 4, as shown in FIG. 4C, the electric current is not induced in the secondary winding N2.

(Mode 2d)

Figure 4D:
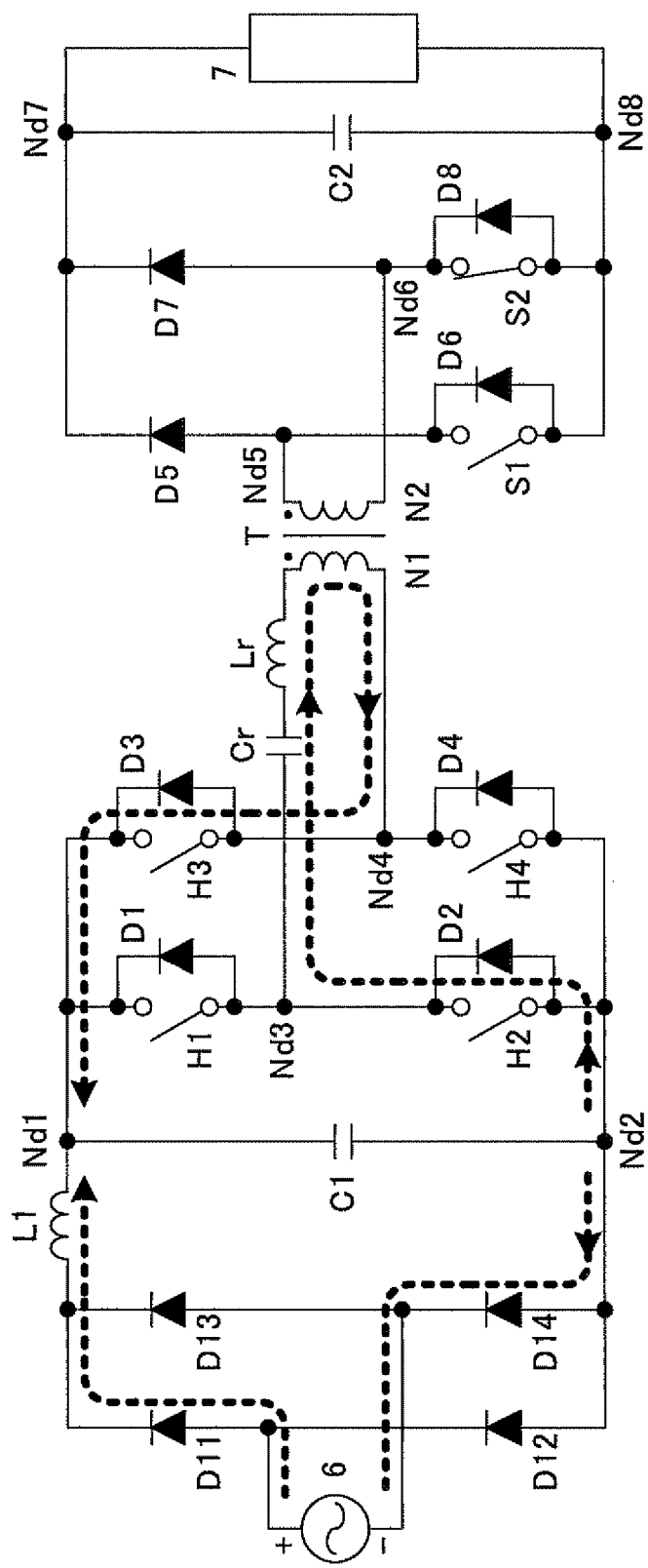
FIG. 4D is a drawing for explaining operations of the second phase-shift control of the power supply apparatus 1 according to the first embodiment of the present invention.

If the first and fourth switching elements H1, H4 are simultaneously turned off (see FIG. 5) in the timing of the time t24 shown in FIG. 5, it will be the condition of the mode 2d. In this case, in the vicinity of the first switching circuit 3, the resonance inductor electric currents ILr which flowed in the first and fourth switching elements H1, H4 respectively, are commuted to the second and third diodes D2, D3 respectively. As a result, as shown in FIG. 4D, the electric current route by way of each part of the second node Nd2-->the second diode D2 inverse-parallel-connected to second switching element H2--> the third node Nd3-->the resonance capacitor Cr-->the resonance inductor Lr-->the primary winding N1-->the fourth node Nd4-->the third diode D3 inverse-parallel-connected to the third switching element H3-->the first node Nd1, is formed. Along this electric current route, the electric current flows.

The electromagnetic energy accumulated in the resonance inductor Lr is supplied to the primary winding N1 of the transformer T. As a result, the electric current ILr of the primary winding N1 gradually decreases as shown in FIG. 5. On the other hand, the electric current IN2 of the secondary winding N2 gradually increases as shown in FIG. 5. In the mode 2d, as shown in FIG. 5, the second and third switching elements H2, H3 are in the off-condition, respectively. Accordingly, matching the timing in this off-condition, the second and third switching elements H2, H3 are simultaneously being turned on (zero voltage switching).

(Mode 2e)

In the timing of the time t25 shown in FIG. 5, if the circulation direction of the resonance inductor electric current ILr flowing in the primary winding N1 is inverted (in the example of FIG. 5, inversion from positive to negative), it will be the condition of the mode 2e. This mode 2e is a symmetric operation of the mode 2a.

Figure 4E:
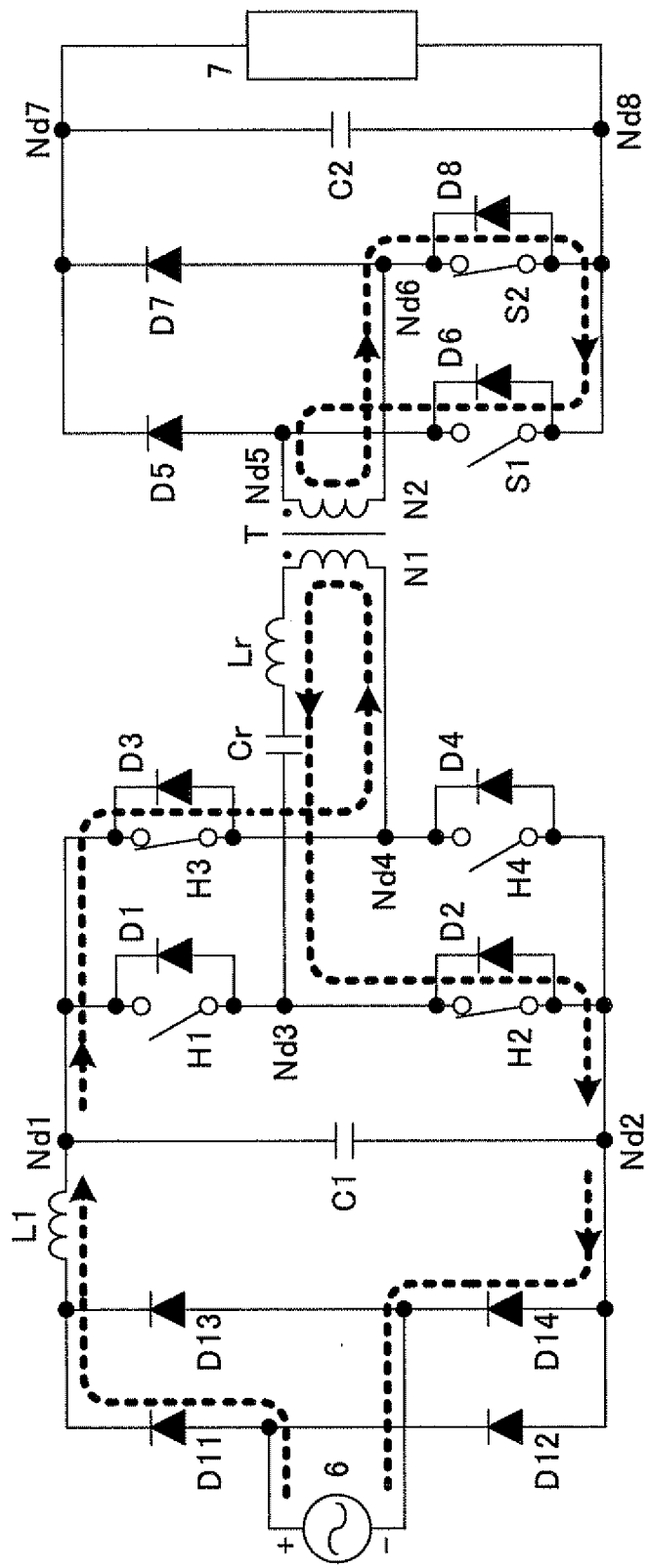
FIG. 4E is a drawing for explaining operations of the second phase-shift control of the power supply apparatus 1 according to the first embodiment of the present invention.

More specifically, in the mode 2e defined in the period from the time t25 to the time t26 shown in FIG. 5, as shown in FIG. 4E, and FIG. 5, the second and third switching elements H2, H3 are in the on-condition, in contrast to the mode 2a. In this case, in the vicinity of the first switching circuit 3, the first input voltage (voltage between the first DC terminals Nd1, Nd2) is applied to the resonance capacitor Cr, the resonance inductor Lr, and the primary winding N1, respectively.

As a result, as shown in FIG. 4E, the electric current route by way of each part of the first node Nd1-->the third switching element H3-->the fourth node Nd4-->the primary winding N1-->the resonance inductor Lr-->the resonance capacitor Cr-->the third node Nd3-->the second switching element H2-->the second node Nd2, is formed. Along this electric current route, the electric current flows.

In the vicinity of the second switching circuit 4, the electric current is induced in the secondary winding N2, because of the power-on to the primary winding N1. As a result, as shown in FIG. 4E, in contrast to the mode 2a, the electric current route by way of each part of the eighth node Nd8-->the fifth switching element S1-->the fifth node Nd5-->the secondary winding N2-->the sixth node Nd6-->the sixth switching element S2-->the eighth node Nd8, is formed. The electric current circulating this electric current route flows. In the mode 2e, as shown in FIG. 4E and FIG. 5, the sixth switching element S2 is in the on (synchronous rectification) condition.

In the vicinity of the AC power supply 6, as shown in FIG. 4E, an electric current route which is similar to the mode 2a, is formed. Along the electric current route, the electric current flows. Accordingly, the duplicated description is omitted.

Hereinafter, after each of the symmetric operations of the mode 2b through 2d, back to the mode 2a, and the aforementioned processing is repeated.

In the aforementioned second phase-shift control, the input electric current and the output electric power are adjusted, by changing the phase of the turn-off timing of the first through fourth switching elements H1 through H4 and the turn-off timing of the fifth and sixth switching elements S1, S2, and performing the second duty control to change the duration of the period to substantially short-circuit the terminals Nd5, Nd6 of the secondary winding N2 while applying the voltage between the first AC terminals Nd3, Nd4 of the first switching circuit 3.

That is to say, while the first, fourth and fifth switching elements H1, H4, S1 together shorten the period of the mode 2a in the on-condition and reduce the input electric current and the output electric power, to the contrary, the input electric current and the output electric power are increased by lengthening the period of the mode 2a. In addition, while the second, third and sixth switching elements H2, H3, S2 together shorten the period of the mode 2e in the on-condition and reduce the input electric current and the output electric power, to the contrary, the input electric current and the output electric power are increased by lengthening the period of the mode 2e.

Incidentally, in the case that the operation mode of the control unit 5 is switched between the first phase-shift control and the second phase-shift control, the change of the output in the switched part may be discontinuous in some cases. In such cases, it is possible to improve the level in which the output change is discontinuous, by providing an intermediate condition between the first phase-shift control and the second phase-shift control, and switching the operation mode by way of this intermediate condition.

More specifically, it is sufficient to adopt a configuration to turn off the sixth switching element S2 (alternatively, the fifth switching element S1) in a synchronized manner with the turn-off timing of the first and fourth switching elements H1, H4 (alternatively, the second and third switching elements H2, H3), as the maximum output condition of the first phase-shift control and also the minimum output condition of the second phase-shift control. Describing further details, it is sufficient to adopt a configuration in which the period from the turn-off of the first switching element H1 (alternatively, the second switching element H2) to the turn-off of the sixth switching element S2 (alternatively, the fifth switching element S1) is fixed to zero or the like in the first phase-shift control, and is lengthened in the second phase-shift control.

The control unit 5 has a power factor improvement control function. The adjustment of the input electric current is performed similarly to the adjustment of the output electric power. That is to say, if the output electric power is increased, the input electric current also increases, and to the contrary, if the output electric power is decreased, the input electric current also decreases. Therefore, if the control is performed to improve the power factor of the voltage and the electric current input from the AC power supply 6, the input electric power from the AC power supply 6 fluctuates in the 2-time frequency of the AC power supply 6, therefore, the output electric power also fluctuates in the 2-time frequency of the AC power supply 6.

However, in the case to charge the secondary battery as the DC load 7, even if the output electric power fluctuates, any particular problems are not generated. Needless to say, for example, if, for the second smoothing capacitor C2, one with an enough large capacitance is utilized, alternatively, if the LC filter comprising an inductor and a capacitor is inserted between the second smoothing capacitor C2 and the DC load 7, it is possible to suppress the fluctuation of the electric power, the voltage, and the electric current to be supplied to the DC load 7.

Incidentally, the resonance capacitor Cr has an effect to prevent the bias magnetism of the transformer T, by excluding the DC component of the resonance inductor electric current ILr which flows in the primary winding N1. Needless to say, if, for the resonance capacitor Cr, one with a small capacitance is utilized, it is possible to increase the step-up ratio by the serial resonance with the excitation inductance of the resonance inductor Lr and the transformer T.

As aforementioned, in the power supply apparatus 1 according to the first embodiment, the control unit 5 has been made to substantially short-circuit the second AC terminals Nd5, Nd6, by controlling the switching operations performed by the second switching circuit 4. Thus, it is possible to realize the zero voltage switching according to all switching elements H1 through H4, S1, S2 utilized for the power supply apparatus 1. Therefore, by the power supply apparatus 1 according to the first embodiment, the high-efficiency power supply apparatus 1 in light of the reduction of the switching loss in the switching elements H1 through H4, S1, S2, can be provided.

Furthermore, in the power supply apparatus 1 according to the first embodiment, the control unit 5 has been made to perform the power factor improvement control which controls the electric current out of the AC power supplied from the AC power supply 6 in the sinusoidal shapes. Therefore, by the power supply apparatus 1 according to the first embodiment, the high-efficiency power supply apparatus 1 in light of the power factor improvement of the AC power, can be provided.

Furthermore, in the power supply apparatus 1 according to the first embodiment, the control unit 5 has been made to adjust the magnitude of the DC power supplied to the DC load 7, by executing at least either (including the modification to execute both controls simultaneously) of the first duty control (the first phase control) for changing the duration of the period to apply the positive and negative full-wave-rectification voltages to the first DC terminals Nd1, Nd2, or, the second duty control (the second phase control) for changing the duration of the period to substantially short-circuit the second AC terminals Nd5, Nd6 while applying the positive and negative full-wave-rectification voltages to the first DC terminals Nd1, Nd2. Therefore, by the power supply apparatus 1 according to the first embodiment, the high-efficiency power supply apparatus 1 in light of the precise fine-adjustment and the extension of the adjustment coverage of the DC power, can be provided.

Furthermore, in the power supply apparatus 1 according to the first embodiment, the first switching circuit 3 comprises the first switching leg SL1 to serial-connect the first and second switching elements H1, H2, and the second switching leg SL2 to serial-connect the third and fourth switching elements H3, H4, and the first and second switching legs SL1, SL2 are mutually parallel-connected. The terminals connected to the first switching leg SL1 (the first node Nd1 and the second node Nd2) are referred to as the first DC terminals, and the terminals connected to the serial node (the third node Nd3) of the first and second switching elements H1, H2 and the serial node (the fourth node Nd4) of the third and fourth switching elements H3, H4 are referred to as the first AC terminals.

Furthermore, the second switching circuit 4 comprises the third switching leg SL3 to serial-connect the fifth diode D5 and the fifth switching element S1, and the fourth switching leg SL4 to serial-connect the seventh diode D7 and the sixth switching element S2, and the third and fourth switching legs SL3, SL4 are mutually parallel-connected. The terminals connected to the third switching leg SL3 (the seventh node Nd7 and the eighth node Nd8) are referred to as the second DC terminals, and the terminals connected to the serial node (the fifth node Nd5) of the fifth diode D5 and the fifth switching element S1 and the serial node (the sixth node Nd6) of the seventh diode D7 and the sixth switching element S2 are referred to as the second AC terminals.

Therefore, by the power supply apparatus 1 according to the first embodiment, the high-efficiency power supply apparatus 1 to specify the concrete configurations of the first and second switching circuits 3, 4, can be provided.

Furthermore, the power supply apparatus 1 according to the first embodiment has adopted the configuration in which the first duty control is the first phase-shift control to change the phase of the turn-off timing of the first and second switching elements H1, H2 and the turn-off timing of the third and fourth switching elements H3, H4 and the second duty control is the second phase-shift control to change the phase of the turn-off timing of the first through fourth switching elements H1 through H4 and the turn-off timing of the fifth and sixth switching elements S1, S2. Therefore, by the power supply apparatus 1 according to the first embodiment, the high-efficiency power supply apparatus 1 which is capable of realizing the flexible adjustment of the output electric power by utilizing the first and second phase-shift controls, can be provided.

Furthermore, in the power supply apparatus 1 according to the first embodiment, the control unit 5 has been made to alternatively switch and to execute either of the first or the second duty control, on the basis of the step-up ratio of the voltage being input by way of the first DC terminals Nd1, Nd2 and the voltage being output from the second DC terminals Nd7, Nd8. Therefore, by the power supply apparatus 1 according to the first embodiment, the high-efficiency power supply apparatus 1 which is capable of realizing the flexible adjustment of the output electric power by alternatively switching and utilizing either of the first or the second phase-shift control, can be provided. Moreover, since the alternative selection of either of the first or the second phase-shift control is made to be performed on the basis of the step-up ratio, it is possible to realize the switching of the appropriate phase-shift control mode in light of the balance of the input and the output.

Furthermore, the power supply apparatus 1 according to the first embodiment has adopted the configuration comprising the rectifier circuit 2 for generating the full-wave-rectification voltage of the AC power supply 6, wherein, the rectifier circuit 2 bridge-connects the first through fourth rectifier diodes D11 through D14. By the power supply apparatus 1 according to the first embodiment, it is possible to generate the full-wave-rectification voltage of the AC power supply 6 by utilizing the rectifier circuit 2 and to acquire the full-wave-rectification voltage to be converted to the DC power, simply and appropriately.

Furthermore, by the power supply apparatus 1 according to the first embodiment, the high-efficiency power supply apparatus 1 in light of the exclusion of the higher harmonic wave noise can be provided, since the smoothing inductor L1 is connected between the AC power supply 6 and the first smoothing capacitor C1.

Furthermore, by the power supply apparatus 1 according to the first embodiment, the high-efficiency power supply apparatus 1 in light of the accumulation of the AC power, the improvement of the power factor and the selectivity of the pass-through bandwidth can be provided, by the serial resonance circuit according to the combination of the coil (either of the primary winding N1 or the secondary winding N2, or both thereof) and the resonance capacitor Cr, since the resonance capacitor Cr serial-connected to either of the primary winding N1 or the secondary winding N2, or both thereof between the first AC terminals Nd3, Nd4, is further comprised.

Furthermore, by the power supply apparatus 1 according to the first embodiment, the high-efficiency power supply apparatus 1 in light of the reduction of the conduction loss and switching loss can be provided, since the diodes are inverse-parallel-connected to each of the first through sixth switching elements H1 through H4, S1, S2.

Furthermore, by the power supply apparatus 1 according to the first embodiment, the power supply apparatus 1 in light of the high-efficiency charge of the secondary battery can be provided, since the DC load 7 comprises the secondary battery and charges the secondary battery, by utilizing the DC power being output from the second DC terminals Nd7, Nd8.

Furthermore, the power supply apparatus 1 according to the first embodiment has adopted the configuration comprising the first switching circuit 3, the second switching circuit 4, the resonance inductor Lr serial-connected to either of the primary winding N1 or the secondary winding N2 or both thereof, and the control unit 5 for controlling the switching operations performed by each of the first and second switching circuits 3, 4.

The first switching circuit 3 comprises the first switching leg SL1 to serial-connect the first and second switching elements H1, H2 and the second switching leg SL2 to serial-connect the third and fourth switching elements H3, H4, and the first and second switching legs SL1, SL2 are mutually parallel-connected. The terminals connected to the first switching leg SL1 (the first node Nd1 and the second node Nd2) are referred to as the first DC terminals, and the terminals connected to the serial node (the third node Nd3) of the first and second switching elements H1, H2 and the serial node (the fourth node Nd4) of the third and fourth switching elements H3, H4 are referred to as the first AC terminals.

On the other hand, the second switching circuit 4 comprises the third switching leg SL3 to serial-connect the fifth diode D5 and the fifth switching element S1 and the fourth switching leg SL4 to serial-connect the seventh diode D7 and the sixth switching element S2, and the third and fourth switching legs SL3, SL4 are mutually parallel-connected. The terminals connected to the third switching leg SL3 (the seventh node Nd7 and the eighth node Nd8) are referred to as the second DC terminals, and the terminals connected to the serial node (the fifth node Nd5) of the fifth diode D5 and the fifth switching element S1 and the serial node (the sixth node Nd6) of the seventh diode D7 and the sixth switching element S2 are referred to as the second AC terminals.

In addition, the control unit 5 is made to alternatively execute the first phase-shift control for changing the phase of the turn-off timing of the first and second switching elements H1, H2 and the turn-off timing of the third and fourth switching elements H3, H4, or the second phase-shift control for changing the phase of the turn-off timing of the first through fourth switching elements H1 through H4 and the turn-off timing of the fifth and sixth switching elements S1, S2.

By the power supply apparatus 1 according to the first embodiment, the high-efficiency power supply apparatus 1 to specify the concrete configurations of the first and second switching circuits 3, 4, can be provided. In addition, the high-efficiency power supply apparatus 1 which is capable of realizing the flexible adjustment of the output electric power by alternatively switching and utilizing either of the first or the second phase-shift control, can be provided.

[Variation of Power Supply Apparatus 1 According to First Embodiment]

Figure 6:
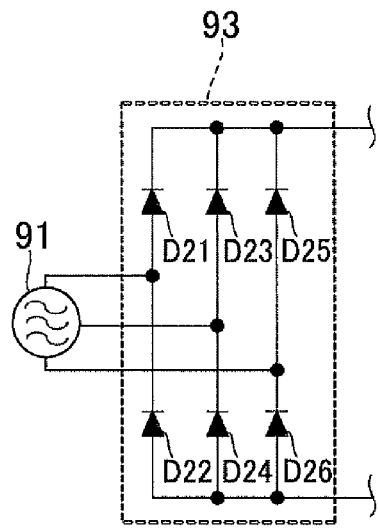
FIG. 6 is a circuit diagram to show a three-phase rectifier bridge circuit according to the differences from the first embodiment, out of the power supply apparatuses according to the variation of the first embodiment of the present invention.

FIG. 6 is a circuit diagram to show a variation of the power supply apparatus 1 according to the first embodiment of the present invention. This variation has adopted the three-phase AC power supply 91, instead of the single-phase AC power supply 6. In conjunction with this variation, the three-phase bridge-type rectifier circuit 93 comprising the twenty-first through twenty-sixth rectifier diodes D21 through D26 mutually bridge-connected instead of the rectifier circuit 2, is adopted. Incidentally, the configurations of other parts are identical.

By the variation of the power supply apparatus 1 according to the first embodiment of the present invention, the high-efficiency power supply apparatus 1 in light of the correspondence to the three-phase AC power supply 91, can be provided.

[Second Embodiment]

Prior to the description of the power supply system of the electric vehicle of the second embodiment of the present invention, the background art of the present invention is described.

Recently, due to the higher awareness of the global environment conservation, electric vehicles are being popularized. The electric vehicles comprise the motors for the driving sources and the secondary batteries for the motor driving. These secondary batteries are charged, by utilizing the DC power electric-power-converted and acquired from the commercial AC power supply. The DC power charged in the secondary batteries is inverse-converted to the AC power and provided for the motor driving.

In order to safely charge the secondary batteries from the commercial power supply with less electric power, the converter having the high conversion efficiency and also being the insulated-type, is required. Generally, in order to acquire the DC power insulated from the AC power supply, the non-insulated-type AC-DC converters are utilized. While controlling the input electric current from the AC power supply in the sinusoidal shapes, the DC power is generated, and the DC power is acquired by insulating this DC power by the insulated-type DC-DC converter.

However, since the aforementioned configuration is a 2-stage configuration of the non-insulated-type AC-DC converter and the insulated-type DC-DC converter, there has been a problem that the power supply apparatus is large-sized and that the conversion efficiency tends to be reduced.

Figure 7:
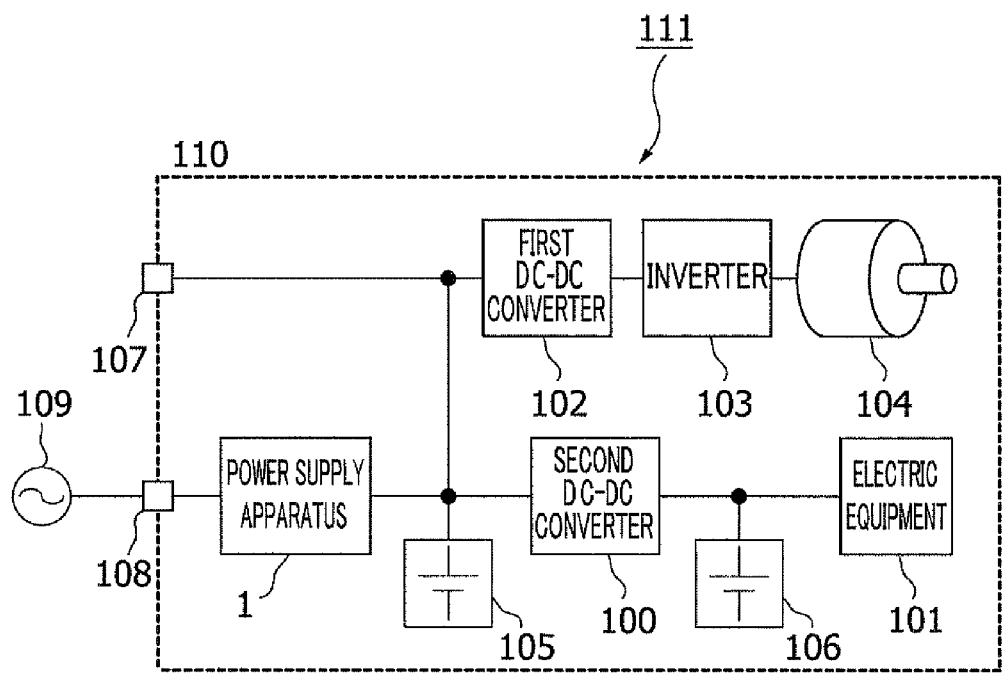
FIG. 7 is a function block diagram to show an outline of a power supply system of an electric vehicle 110 embedding the power supply apparatus 1 according to the first embodiment of the present invention.

Accordingly, the power supply apparatus 1 according to the first embodiment has been considered to be applied to the electric vehicles. FIG. 7 is a schematic configuration drawing of the power supply system 111 of the electric vehicle 110 according to the second embodiment which the power supply apparatus 1 according to the first embodiment of the present invention is applied to.

As shown in FIG. 7, the power supply system 111 of the electric vehicle 110 according to the second embodiment comprises the power supply apparatus 1 according to the first embodiment, the first DC-DC converter 100 for supplying the electric power to the auxiliary battery 106, various electric equipments 101, the second DC-DC converter 102 for supplying the electric power to the inverter 103, the inverter 103 for driving the driving motor 104, the driving motor 104 for driving the wheel (not shown) of the electric vehicle 110, the secondary battery 105, the auxiliary battery 106 in charge of the electric-power-supply to the electric equipment 101, the high-speed charge connector 107 for connecting the external DC power supply (not shown) such as the high-speed chargers or the like, and the plug-in charge connector 108 for connecting to the external AC power supply 109.

The power supply apparatus 1 according to the first embodiment is connected to the secondary battery 105 as the DC load and the plug-in charge connector 108. To the secondary battery 105, the first and second DC-DC converters 100, 102 and the high-speed charge connector 107 are connected.

The power supply apparatus 1 according to the first embodiment operates to charge the secondary battery 105 by converting the AC power of the AC power supply 109 connected by way of the plug-in charge connector 108 to the DC power.

By the power supply system 111 of the electric vehicle 110 according to the second embodiment, the secondary battery 105 which is loaded on the electric vehicle 110 can be charged with the high-efficiency, for example, from the commercial AC power supply 109, by applying the power supply apparatus 1 according to the first embodiment. Incidentally, the power supply system 111 of the electric vehicle 110 according to the second embodiment may be applied to the hybrid automobiles instead of the electric vehicle 110.

[Other Embodiment]

A plurality of aforementioned embodiments show the examples to embody the present invention. Therefore, it should be noted that the technical scope of the present invention is not construed as limited to them. This is because the present invention may be embodied in various forms, without departing from the spirit or the essential characteristics thereof.

For example, in the power supply apparatus 1 according to the first embodiment, MOS-FET has been exemplified and described for the first through sixth switching elements H1 through H4, S1, S2, however the present invention is not limited to this example. For example, IGBT (Insulated Gate Bipolar Transistor), GaN device, SiC (Silicon Carbide) device or the like may be utilized for the switching element. However, in the case to utilize such devices for switching elements, it is required to inverse-parallel-connect the diodes to each of the switching elements.

Furthermore, in the power supply apparatus 1 according to the first embodiment, a modification to full-bridge-connect the first through fourth switching elements H1 through H4 has been exemplified and described for the first switching circuit 3, however, the present invention is not limited to this example. For example, if it is possible for the first switching circuit 3 to change the time to apply the voltage to the primary winding N1, other circuit methods may be adopted.

Furthermore, in the power supply apparatus 1 according to the first embodiment, as shown in FIG. 1, as the second switching circuit 4, the descriptions have been made by exemplifying the modification which comprises the third switching leg SL3 to serial-connect the fifth diode D5 and the fifth switching element S1 by way of the fifth node Nd5, and the fourth switching leg SL4 to serial-connect the seventh diode D7 and the sixth switching element S2 by way of the sixth node Nd6, and mutually parallel-connects these third and fourth switching legs SL3, SL4, however, the present invention is not limited to this example. For example, if it is possible for the second switching circuit 4 to substantially short-circuit the secondary winding N2, other circuit methods may be adopted. Incidentally, the variation in which the capacitor intervenes in the route for substantially short-circuiting the secondary winding N2 is also included within the range of the technical scope of the present invention.

Furthermore, in the power supply apparatus 1 according to the first embodiment, independent inductors have been exemplified and described for the resonance inductor Lr according to the present invention, however, the present invention is not limited to this example. For example, if it is possible for the resonance inductor Lr according to the present invention to store the electromagnetic energy with the magnitude required by the present invention, for example, it may be the inductance component which the electric cables have. This stands for the smoothing inductor L1, similarly.

Lastly, in the power supply apparatus 1 according to the first embodiment, the modifications comprising the AC power supply 6 and the rectifier circuit 2 have been exemplified and described, however, the present invention is not limited to this example. For example, the DC power supply for supplying the DC power may be adopted, instead of the AC power supply 6 and the rectifier circuit 2. By configuring this way, it is possible to embody the DC-DC converter which can adjust the level of the DC voltage supplied from the DC power supply (including the modification with the identical input level and output level) and can supply it to the DC load.

What is claimed is:

1. A power supply apparatus connected between an AC power supply for supplying AC power and a DC load, for converting the AC power supplied from the AC power supply to DC power and supplying to the DC load, comprising:
    a first switching circuit for
        inputting a full-wave-rectification voltage of the AC power supply, by way of a first DC terminal; and
        outputting positive and negative voltages generated by performing switching operations to the input voltage to a primary winding of a transformer connected to first AC terminals;
    a first smoothing capacitor connected to the first DC terminals;
    a second switching circuit for
        inputting electric power induced in a secondary winding which is magnetic-coupled to the primary winding and configures the transformer by way of a second AC terminal connected between terminals of the secondary winding; and
        supplying the DC power generated by performing switching operations to the input electric power and smoothed by a second smoothing capacitor connected to second DC terminals, to the DC load connected to the second DC terminals;
    a resonance inductor serial-connected to either of the primary winding or the secondary winding, or both thereof; and
    a control unit for controlling the switching operations performed by the first and second switching circuits, respectively, wherein
    the first switching circuit comprises a first switching leg to serial-connect first and second switching elements and a second switching leg to serial-connect third and fourth switching elements;
    the first and second switching legs are mutually parallel-connected;
    terminals of the first switching leg comprise the first DC terminals;
    terminals connected to a serial node of the first and second switching elements and a serial node of the third and fourth switching elements comprise the first AC terminals;
    the second switching circuit comprises a third switching leg to serial-connect a fifth diode and a fifth switching element and a fourth switching leg to serial-connect a seventh diode and a sixth switching element;

the third and fourth switching legs are mutually parallel-connected;

terminals connected to the third switching leg comprise the second DC terminals;

terminals connected to a serial node of the fifth diode and the fifth switching element and a serial node of the seventh diode and the sixth switching element comprise the second AC terminals;

the control unit is configured to adjust magnitude of the DC power supplied to the DC load, by alternatively switching and executing a first duty control for changing a duration of a period to apply the positive and negative voltages to the first AC terminals, or a second duty control for changing a duration of a period to substantially short-circuit the second AC terminals while applying the positive and negative voltages to the first AC terminals;

the first duty control is a first phase-shift control for changing a phase of a turn-off timing of the first and fourth switching elements and a turn-off timing of the third and second switching elements; and the second duty control is a second phase-shift control for changing a phase of a turn-off timing of the first through fourth switching elements and a turn-off timing of the fifth and sixth switching elements.

2. The power supply apparatus according to claim 1, wherein the control unit performs a power factor improvement control for controlling electric current out of the AC power supplied from the AC power supply in sinusoidal shapes.

3. The power supply apparatus according to claim 1, wherein the first phase-shift control is executed by the control unit in a case that a voltage of the AC power supply is equal to or greater than a prescribed value, on a basis of a judgment result of the control unit according to whether the voltage of the AC power supply is equal to or greater than the prescribed value or not;

the second phase-shift control is executed by the control unit in a case that the voltage of the AC power supply is lower than the prescribed value, on the basis of the judgment result of the control unit according to whether the voltage of the AC power supply is equal to or greater than the prescribed value or not; and the prescribed value is determined on a basis of a step-up ratio, which is a value to divide an inter-terminal voltage of the DC load by a full-wave-rectification voltage of the AC power supply.

4. The power supply apparatus according to claim 1, further comprising a rectifier circuit for generating a full-wave-rectification voltage of the AC power supply, wherein the rectifier circuit bridge-connects first through fourth rectifier diodes.

5. The power supply apparatus according to claim 1, wherein a smoothing inductor is connected between the AC power supply and the first smoothing capacitor.

6. The power supply apparatus according to claim 1, further comprising a resonance capacitor serial-connected to either of the primary winding or the secondary winding, or both thereof to the first AC terminals.

7. The power supply apparatus according to claim 1, wherein diodes are inverse-parallel-connected to each of the first through sixth switching elements.

8. The power supply apparatus according to claim 1, wherein the DC load comprises a secondary battery; and the secondary battery is charged by utilizing the DC power output from the second DC terminal.

* * * * *